(12) United States Patent
Merker et al.

(10) Patent No.: US 9,514,888 B2
(45) Date of Patent: *Dec. 6, 2016

(54) PROCESS FOR THE PRODUCTION OF ELECTROLYTE CAPACITORS OF HIGH NOMINAL VOLTAGE

(71) Applicant: Heraeus Precious Metals GmbH & Co. KG, Hanau (DE)

(72) Inventors: Udo Merker, Köln (DE); Wilfried Lövenich, Bergisch-Gladbach (DE); Klaus Wussow, Netphen (DE)

(73) Assignee: Heraeus Deutschland GmbH & Co. KG (DE)

( * ) Notice: Subject to any disclaimer, the term of this patent is extended or adjusted under 35 U.S.C. 154(b) by 764 days.

This patent is subject to a terminal disclaimer.

(21) Appl. No.: 13/661,671

(22) Filed: Oct. 26, 2012

(65) Prior Publication Data

US 2013/0070392 A1    Mar. 21, 2013

Related U.S. Application Data

(63) Continuation of application No. 11/520,310, filed on Sep. 13, 2006, now Pat. No. 8,313,538.

(30) Foreign Application Priority Data

Sep. 13, 2005   (DE) .................. 10 2005 043 829

(51) Int. Cl.
| H01G 9/00 | (2006.01) |
| H01G 9/025 | (2006.01) |
| H01G 9/042 | (2006.01) |
| H01G 9/15 | (2006.01) |

(Continued)

(52) U.S. Cl.
CPC ............ *H01G 9/025* (2013.01); *H01G 9/0032* (2013.01); *H01G 9/0036* (2013.01); *H01G 9/04* (2013.01); *H01G 9/042* (2013.01); *H01G 9/045* (2013.01); *H01G 9/15* (2013.01); *Y10T 29/417* (2015.01)

(58) Field of Classification Search
None
See application file for complete search history.

(56) References Cited

U.S. PATENT DOCUMENTS

| 3,398,067 A | * | 8/1968 | Raffalovich | .................. 205/162 |
| 3,671,410 A | * | 6/1972 | Stahr | ............................... 205/75 |
| 4,910,645 A | | 3/1990 | Jonas et al. | |

(Continued)

FOREIGN PATENT DOCUMENTS

| CN | 1529893 A | 9/2004 |
| CN | 1577657 A | 2/2005 |

(Continued)

OTHER PUBLICATIONS

S. Lazarouk et al. "Porous alumina as low-e insulator for multilevel metallization" Microelectronic Engineering 50 (2000) 321-327.*

(Continued)

*Primary Examiner* — Calvin Choi
*Assistant Examiner* — Xiaoming Liu
(74) *Attorney, Agent, or Firm* — Drinker Biddle & Reath LLP

(57) ABSTRACT

The invention relates to a process for the production of electrolyte capacitors having a low equivalent series resistance and low residual current for high nominal voltages, electrolyte capacitors produced by this process and the use of such electrolyte capacitors.

20 Claims, 2 Drawing Sheets

Figure 1:
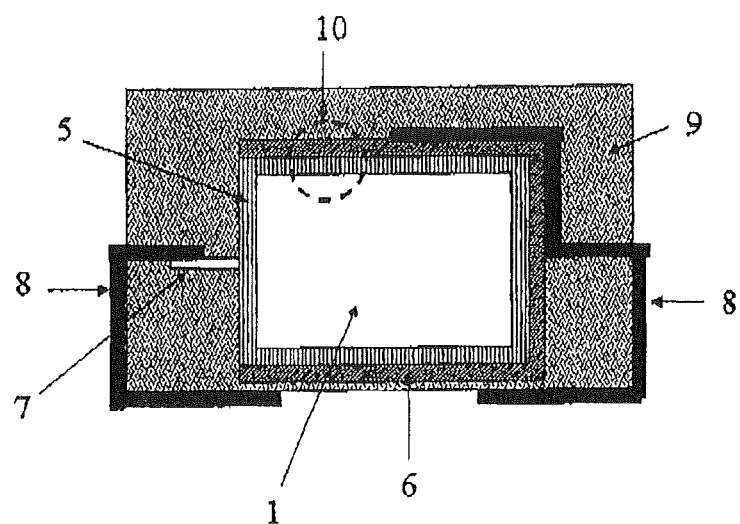

(51) Int. Cl.
*H01G 9/04* (2006.01)
*H01G 9/045* (2006.01)

(56) References Cited

U.S. PATENT DOCUMENTS

| | | | |
|---|---|---|---|
| 5,300,575 A | 4/1994 | Jonas et al. | |
| 5,457,862 A | 10/1995 | Sakata et al. | |
| 5,473,503 A | 12/1995 | Sakata et al. | |
| 5,538,811 A | 7/1996 | Kanbara et al. | |
| 5,567,209 A | 10/1996 | Kobayashi et al. | |
| 5,586,001 A | 12/1996 | Amano et al. | |
| 6,001,281 A | 12/1999 | Lessner et al. | |
| 6,068,794 A * | 5/2000 | Kobayashi et al. | 252/585 |
| 6,086,642 A | 7/2000 | Fukaumi et al. | |
| 6,229,689 B1 | 5/2001 | Kobayashi et al. | |
| 6,361,572 B1 | 3/2002 | Igaki et al. | |
| 6,375,688 B1 | 4/2002 | Akami et al. | |
| 6,376,105 B1 | 4/2002 | Jonas et al. | |
| 6,409,777 B2 | 6/2002 | Kobatake et al. | |
| 6,430,033 B1 | 8/2002 | Mitsui et al. | |
| 6,473,293 B2 | 10/2002 | Shimada et al. | |
| 6,475,670 B1 | 11/2002 | Ito | |
| 6,515,847 B1 | 2/2003 | Naraya | |
| 6,635,729 B1 | 10/2003 | Groenendaal et al. | |
| 6,671,167 B2 | 12/2003 | Araki et al. | |
| 6,987,663 B2 | 1/2006 | Merker et al. | |
| 7,149,074 B2 | 12/2006 | Kimmel et al. | |
| 7,341,801 B2 | 3/2008 | Reuter et al. | |
| 7,377,947 B2 | 5/2008 | Merker et al. | |
| 7,411,779 B2 | 8/2008 | Merker et al. | |
| 7,563,290 B2 | 7/2009 | Qiu et al. | |
| 2002/0042986 A1 | 4/2002 | Sato et al. | |
| 2002/0077450 A1 | 6/2002 | Kirchmeyer et al. | |
| 2003/0133256 A1 | 7/2003 | Yoshida et al. | |
| 2003/0147202 A1 | 8/2003 | Kudoh et al. | |
| 2004/0184222 A1 * | 9/2004 | Tsai et al. | 361/525 |
| 2005/0013094 A1 * | 1/2005 | Reuter et al. | 361/525 |
| 2005/0111165 A1 * | 5/2005 | Merker et al. | 361/525 |
| 2005/0128685 A1 | 6/2005 | Hasegawa | |
| 2007/0064376 A1 | 3/2007 | Merker et al. | |
| 2008/0232038 A1 * | 9/2008 | Cohen et al. | 361/532 |

FOREIGN PATENT DOCUMENTS

| | | |
|---|---|---|
| DE | 196 27 071 A1 | 1/1998 |
| EP | 0 340 512 A2 | 11/1989 |
| EP | 0 440 957 A2 | 8/1991 |
| EP | 0 899 757 | 3/1999 |
| EP | 1498920 A2 | 1/2005 |
| EP | 1524678 A2 | 4/2005 |
| JP | 07118370 A | 5/1995 |
| JP | 11-045824 A | 2/1999 |
| JP | 2001102255 A | 4/2001 |
| JP | 2001167981 A | 6/2001 |
| JP | 2001283655 A | 10/2001 |
| JP | 2002324732 A | 11/2002 |
| JP | 2003173933 A | 6/2003 |
| JP | 2003229330 A | 8/2003 |
| JP | 2003229330 A | 8/2003 |
| JP | 2003-264127 A | 9/2003 |
| JP | 2003289019 A | 10/2003 |
| JP | 2005068166 A | 3/2005 |
| JP | 2005109252 A | 4/2005 |
| JP | 2005123630 A | 5/2005 |
| JP | 2006185973 A | 7/2006 |
| JP | 2006231615 A | 9/2006 |
| WO | WO-00/14139 A1 | 3/2000 |
| WO | WO-02/37536 A2 | 5/2002 |
| WO | WO-02/086923 A2 | 10/2002 |
| WO | WO-2004070750 A1 | 8/2004 |
| WO | WO-2007031207 A1 | 3/2007 |

OTHER PUBLICATIONS

Stuart Lee "dictionary of composite materials technology" Technomic publishing company. Inc. 1989, ISBN 87762-600-6 p. 43.*

Carney, et al., "Determination of nanoparticle size distribution together with density or molecular weight by 2D analytical ultracentrifugation" Nature Communications, Jun. 7, 2011, pp. 1-8.

Handbook for Aluminum Processing Technology (Mar. 5, 1970).

Blanchard, P., et al., "Thieno[3,4-*b*]-104-Oxathiane: An Unsymmetrical Sulfur Analogue of 3,4-Ethylenedioxythiophene (EDOT) as a Building Block for Linear π-Conjugated Systems", Organic Letter, 2002, vol. 4, No. 4, pp. 607-609.

Fact sheet of Baytron P., Mar. 28, 2002.

Groenendaal, L. B., et al "Poly(3,4-ethylenedioxythiophene) and Its Derivatives: Past, Present, and Future", Advanced Materials, 2000, vol. 12, No. 7, pp. 481-494.

Müller, H. G., et al., "Automated Determination of Particle-Size Distributions of Dispersions by Analytical Ultracentrifugation", Colloid Polym Sci, 1989, vol. 267, pp. 1113-1116.

Presentation made by Agfa on Apr. 8, 2002 at the ACS meeting.

Schröder, G., "Methoden der organischen Chemie", Makromoleulare, 1987, vol. E 20., pp. 1141, 1158, 1162, 1186, 1231, 1232.

* cited by examiner

PROCESS FOR THE PRODUCTION OF ELECTROLYTE CAPACITORS OF HIGH NOMINAL VOLTAGE

RELATED APPLICATIONS

This Application is a Continuation of application Ser. No. 11/520,310 filed on Sep. 13, 2006 which is incorporated by reference in its entirety for all useful purposes. Application Ser. No. 11/520,310 claims benefit to German application no. 10 2005 043 829 filed on Sep. 13, 2005 which is incorporated by reference in its entirety for all useful purposes.

BACKGROUND OF THE INVENTION

1. Field of Invention

The invention relates to a process for the production of electrolyte capacitors having a low equivalent series resistance and low residual current for high nominal voltages, electrolyte capacitors produced by this process and the use of such electrolyte capacitors.

2. Description of Related Art

A commercially available solid electrolyte capacitor as a rule comprises a porous metal electrode, an oxide layer on the metal surface, an electrically conductive solid which is incorporated into the porous structure, an outer electrode (contacting), such as e.g. a silver layer, and further electrical contacts and an encapsulation.

Examples of solid electrolyte capacitors are tantalum, aluminium, niobium and niobium oxide capacitors with charge transfer complexes, or pyrolusite or polymer solid electrolytes. The use of porous bodies has the advantage that because of the high surface area a very high capacitance density, i.e. a high electrical capacitance over a small space, can be achieved.

π-Conjugated polymers are particularly suitable as solid electrolytes because of their high electrical conductivity. π-Conjugated polymers are also called conductive polymers or synthetic metals. They are increasingly gaining economic importance, since polymers have advantages over metals in respect of processability, weight and targeted adjustment of properties by chemical modification. Examples of known π-conjugated polymers are polypyrroles, polythiophenes, polyanilines, polyacetylenes, polyphenylenes and poly(p-phenylene-vinylenes), a particularly important polythiophene which is used industrially being poly-3,4-(ethylene-1,2-dioxy)thiophene, often also called poly(3,4-ethylenedioxythiophene), since it has a very high conductivity in its oxidized form.

Technical development in electronics increasingly requires solid electrolyte capacitors having very low equivalent series resistances (ESR). Reasons for this are, for example, falling logic voltages, a higher integration density and increasing cycle frequencies in integrated circuits. Furthermore, a low ESR also lowers energy consumption, which is particularly advantageous for mobile battery-operated uses. There is therefore the desire to reduce the ESR of solid electrolyte capacitors to as low a value as possible.

European Patent Specification EP-A-340 512 describes the preparation of a solid electrolyte from 3,4-ethylene-1,2-dioxythiophene and the use of its cationic polymers, prepared by oxidative polymerization, as a solid electrolyte in electrolyte capacitors. Poly(3,4-ethylenedioxythiophene), as a substitute for manganese dioxide or charge transfer complexes in solid electrolyte capacitors, lowers the equivalent series resistance of the capacitor due to the higher electrical conductivity, and improves the frequency properties.

A disadvantage of this process and similar processes which use a chemical in situ polymerization is that no solid electrolyte capacitors of low ESR and low residual current which have a high nominal voltage can be produced with them.

After deposition of the polymer solid electrolyte, the oxide layer of the capacitor must conventionally be re-formed in order to achieve low residual currents, as described e.g. in EP-A 899 757. For this, the capacitor is impregnated in an electrolyte and exposed to an electrical voltage which corresponds to the anodizing voltage of the oxide film.

In the production of polymer electrolyte capacitors having nominal voltages of from 16 V, the re-forming of the oxide layer becomes more difficult as the nominal voltage increases, and can no longer be carried out for nominal voltages of from 25 V without seriously impairing the ESR. Weaker re-forming, i.e. a reforming far below the anodizing voltage, remains as the way round the problem. However, this leads to a reduced reliability of the capacitor.

The break-through voltage of the capacitor is a measure of the reliability. The break-through voltage is the voltage at which the dielectric (oxide layer) of the capacitor no longer withstands the electrical field strength and electrical discharges occur between the anode and cathode, which leads to a short circuit in the capacitor. The higher the break-through voltage, the better the quality of the dielectric and therefore the more reliable also the capacitor. The higher the break-through voltage of the capacitor, the higher the nominal voltage at which it can be employed.

In polymer capacitors of low nominal voltage, the break-through voltage is close to the anodizing voltage and therefore far above the nominal voltage, which is typically two to four times lower than the anodizing voltage. In polymer solid electrolyte capacitors of high nominal voltage, however, the break-through voltage drops to significantly below the anodizing voltage due to the problems described above during the re-forming. As a result, the reliability of these capacitors decreases. It is therefore desirable to increase the break-through voltage and therefore the reliability of polymer solid electrolyte capacitors.

Numerous field of use in electronics, such as, for example, automobile electronics or voltage filtering in mains components, require the use of solid electrolyte capacitors of high nominal voltage and low ESR and residual current with a high reliability.

SUMMARY OF THE INVENTION

There is therefore a need for suitable processes for the production of solid electrolyte capacitors of low equivalent series resistance (ESR) and low residual current which have a high nominal voltage.

The object was therefore to provide such a process and the capacitors improved by this means.

Surprisingly, it has now been found that if dispersions comprising particles of an electrically conductive polymer having an average diameter of from 1 to 100 nm are used for the formation of the solid electrolyte, such capacitors can be produced.

It is surprising that if such particles are used no re-forming of the oxide film is necessary and the corresponding capacitors nevertheless have very low residual currents.

The present invention therefore provides a process for the production of an electrolyte capacitor at least comprising the steps that a) a porous electrode body (2) of an electrode material is subjected to anodic oxidation for formation of a dielectric (3) which covers the surface of this electrode material,
b) on to the porous body at least comprising
c) the porous electrode body (2) of the electrode material and the dielectric (3)
d) is applied a dispersion A)
e) which comprises at least particles B) of an electrically conductive polymer and a dispersing agent D), and for the formation of a solid electrolyte (4) which completely or partly covers the dielectric surface, the dispersing agent D) is at least partly removed and/or cured, characterized in that the maximum anodizing voltage during the anodic oxidation of the porous electrode body (2) is greater than 30 V and the particles B) of the conductive polymer in the dispersion A) have an average diameter of from 1 to 100 nm.

A BRIEF DESCRIPTION OF THE FIGURES

FIG. 1 describes a diagrammatic representation of the construction of a solid electrolyte capacitor.

Figure 2:
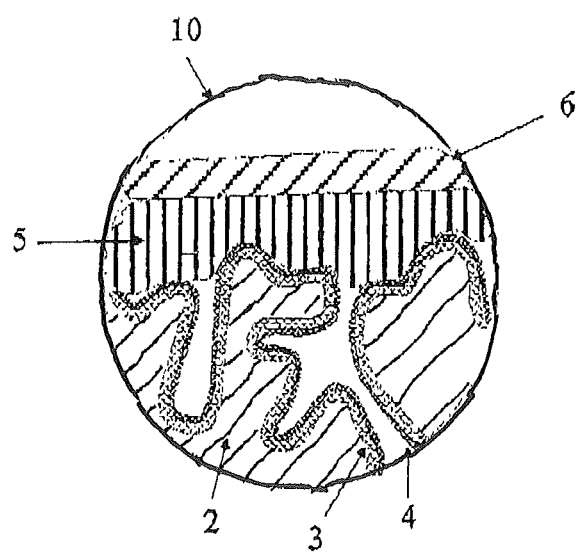

FIG. 2 describes the enlarged diagram detail 10 from FIG. 1 which represents the diagrammatic layer construction of the tantalum capacitor according to the invention.

A DETAILED DESCRIPTION OF THE INVENTION

The present invention provides a A process for the producing an electrolytic capacitor which comprises Subjecting a porous electrode body of an electrode material to anodic oxidation for formation of a dielectric which covers the surface of the electrode material,
Applying a dispersion A) on to the porous body wherein the porous body comprises the porous electrode body of the electrode material and the dielectric,
wherein said dispersion a) comprises at least particles B) of an electrically conductive polymer and a dispersing agent D), and
forming a solid electrolyte which completely or partly covers the dielectric surface, and the dispersing agent D) is at least partly removed and/or cured,
wherein the maximum anodizing voltage during the anodic oxidation of the porous electrode body is greater than 30 V and the particles B) of the conductive polymer in the dispersion A) have an average diameter of from 1 to 100 nm.

The diameter of the particles B) is determined via an ultracentrifuge measurement. The general procedure is described in Colloid Polym. Sci. 267, 1113-1116 (1989). In the case of particles B) which swell in the dispersion, the particle size is determined in the swollen state. A diameter distribution of the particles B) relates to a weight distribution of the particles in the dispersion as a function of the particle diameter.

In the process, the particles B) of the conductive polymer in the dispersion A) preferably have an average diameter of from 1 to 80 nm, particularly preferably from 1 to 50 nm, very particularly preferably from 5 to 40 nm.

In the process, the particles B) of the conductive polymer in the dispersion A) preferably have a $d_{90}$ value of the diameter distribution of less than 150 nm, particularly preferably less than 100 nm, very particularly preferably less than 80 nm and extremely preferably less than 50 nm.

In the process, the particles B) of the conductive polymer in the dispersion A) preferably have a $d_{10}$ value of the diameter distribution of greater than 1 nm, particularly preferably greater than 3 nm, very particularly preferably greater than 5 nm.

In this context, the $d_{10}$ value of the diameter distribution states that 10% of the total weight of all the particles B) of the conductive polymer in the dispersion A) can be assigned to those particles B) which have a diameter of less than or equal to the $d_{10}$ value. The $d_{90}$ value of the diameter distribution states that 90% of the total weight of all the particles B) of the conductive polymer in the dispersion A) can be assigned to those particles B) which have a diameter of less than or equal to the $d_{90}$ value.

Preferably, dispersions A) of which the films in the dried state have a specific conductivity of greater than 10 S/cm, particularly preferably greater than 20 S/cm, very particularly preferably greater than 50 S/cm, extremely preferably greater than 100 S/cm and in a particularly preferred embodiment greater than 200 S/cm are employed.

As is known, metal impurities, in particular transition metals, can damage the dielectric (oxide film) in the capacitor. In order to prevent such metal impurities from reducing the reliability of the capacitor, those dispersions A) which contain few metal impurities are preferred.

In the process, the dispersion A) preferably has a content of metal cations of less than 5,000 mg/kg, particularly preferably less than 1,000 mg/kg, very particularly preferably less than 200 mg/kg.

In the process, the dispersion A) preferably has a content of transition metals of less than 1,000 mg/kg, particularly preferably less than 100 mg/kg, very particularly preferably less than 20 mg/kg.

In the process, the dispersion A) preferably has an iron content of less than 1,000 mg/kg, particularly preferably less than 100 mg/kg, very particularly preferably less than 20 mg/kg.

The low concentrations of metals in the dispersions have the great advantage that the dielectric is not damaged during formation of the solid electrolyte and during later operation of the capacitor.

In the electrolyte capacitor produced by the process according to the invention, the electrode material forms a porous body having a high surface area and is e.g. in the form of a porous sintered body or a roughened film. In the following, this porous body is also called the electrode body for short.

The electrode body covered with a dielectric is also called the oxidized electrode body for short in the following.

The electrode body covered with a dielectric and completely or partly with a solid electrolyte is also called the capacitor body for short in the following.

Outer surface of the capacitor body is understood as meaning the outside surfaces of the capacitor body.

In the context of the invention, the term polymer includes all compounds having more than one identical or different recurring unit.

Conductive polymers are understood as meaning here in particular the compound class of π-conjugated polymers which have an electrical conductivity after oxidation or reduction. Preferably, conductive polymers are understood as meaning those π-conjugated polymers which have an electrical conductivity of the order of at least 1 μS cm$^{-1}$ after oxidation.

The particles B) of the electrically conductive polymer in the dispersion A) preferably comprise at least one polythiophene, polypyrrole or polyaniline, which are optionally substituted, Particularly preferably, the particles B) of the electrically conductive polymer comprise at least one polythiophene having recurring units of the general formula (I) or of the formula (II) or recurring units of the general formulae (I) and (II)

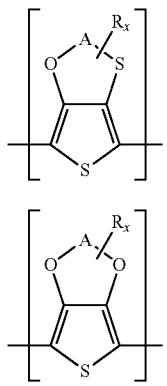

(I)

(II)

a) wherein
b) A represents an optionally substituted $C_1$-$C_5$-alkylene radical,
c) R represents a linear or branched, optionally substituted $C_1$-$C_{18}$-alkyl radical, an optionally substituted $C_5$-$C_{12}$-cycloalkyl radical, an optionally substituted $C_6$-$C_{14}$-aryl radical, an optionally substituted $C_7$-$C_{18}$-aralkyl radical, an optionally substituted $C_1$-$C_4$-hydroxyalkyl radical or a hydroxyl radical,
d) x represents an integer from 0 to 8 and
e) in the case where several radicals R are bonded to A, these can be identical or different, The general formulae (I) and (II) are to be understood as meaning that x substituents R can be bonded to the alkylene radical A.

Polythiophenes having recurring units of the general formula (I), (II) or recurring units of the general formula (I) and (II) wherein A represents an optionally substituted $C_2$-$C_3$-alkylene radical and x represents 0 or 1 are particularly preferred.

Poly(3,4-ethylenedioxythiophene), which is optionally substituted, is very particularly preferred as the conductive polymer of the solid electrolyte.

In the context of the invention, the prefix poly- is to be understood as meaning that more than one identical or different recurring unit is contained in the polymer or polythiophene. The polythiophenes contain a total of n recurring units of the general formula (I) or of the general formula (II) or of the general formulae (I) and (II), wherein n is an integer from 2 to 2,000, preferably 2 to 100. The recurring units of the general formula (I) and/or (II) can in each case be identical or different within a polythiophene. Polythiophenes having in each case identical recurring units of the general formula(e) (I) or (II) or (I) and (II) are preferred.

The polythiophenes preferably in each case carry H on the end groups.

In the context of the invention, $C_1$-$C_5$-alkylene radicals are preferably methylene, ethylene, n-propylene, n-butylene or n-pentylene. $C_1$-$C_{18}$-Alkyl R preferably represent linear or branched $C_1$-$C_{18}$-alkyl radicals, such as methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl or n-octadecyl, $C_5$-$C_{12}$-cycloalkyl radicals R represent, for example, cyclopentyl, cyclohexyl, cycloheptyl, cyclooctyl, cyclononyl or cyclodecyl, $C_5$-$C_{14}$-aryl radicals R represent, for example, phenyl or naphthyl, and $C_7$-$C_{18}$-aralkyl radicals R represent, for example, benzyl, o-, m-, p-tolyl, 2,3-, 2,4-, 2,5-, 2,6-, 3,4-, 3,5-xylyl or mesityl. The above list serves to illustrate the invention by way of example and is not to be considered as conclusive.

As stated above, radicals R and A can be substituted. In the context of the invention, possible optional further substituents of the radicals A and/or of the radicals R are numerous organic groups, for example alkyl, cycloalkyl, aryl, aralkyl, alkoxy, halogen, ether, thioether, disulfide, sulfoxide, sulfone, sulfonate, amino, aldehyde, keto, carboxylic acid ester, carboxylic acid, carbonate, carboxylate, cyano, alkylsilane and alkoxysilane groups as well as carboxamide groups.

Possible substituents for polyaniline or polypyrrole are, for example, the radicals A and R listed above and/or the further substituents of the radicals A and R. Unsubstituted polyanilines are preferred.

The scope of the invention includes all the radical definitions, parameters and explanations which are given above and listed in the following and are general or mentioned in preferred ranges among one another, that is to say also in any desired combination between the particular ranges and preferred ranges.

The polythiophenes employed as the solid electrolyte in the preferred process can be neutral or cationic. In preferred embodiments they are cationic, "cationic" relating only to the charges which sit on the polythiophene main chain. Depending on the substituent on the radicals R, the polythiophenes can carry positive and negative charges in the structural unit, the positive charges being on the polythiophene main chain and the negative charges optionally being on the radicals R substituted by sulfonate or carboxylate groups. In this context, the positive charges of the polythiophene main chain can be partly or completely satisfied by the anionic groups optionally present on the radicals R. Viewed overall, the polythiophenes can be cationic, neutral or even anionic in these cases. Nevertheless, in the context of the invention they are all regarded as cationic polythiophenes, since the positive charges on the polythiophene main chain are decisive. The positive charges are not shown in the formulae, since their precise number and position cannot be determined unambiguously. However, the number of positive charges is at least 1 and not more than n, where n is the total number of all the recurring units (identical or different) within the polythiophene.

To compensate the positive charge, if this is not already done by the optionally sulfonate- or carboxylate-substituted and therefore negatively charged radicals R, the cationic polythiophenes require anions as counter-anions.

Counter-ions can be monomeric or polymeric anions, the latter also being called polyanions in the following.

Polymeric anions are preferred to monomeric anions since they contribute towards the film formation, and due to their size lead to electrically conductive films which are more stable to heat.

Polymeric anions here can be, for example, anions of polymeric carboxylic acids, such as polyacrylic acids, polymethacrylic acids or polymaleic acids, or polymeric sulfonic acids, such as polystyrenesulfonic acids and polyvinylsulfonic acids. These polycarboxylic and -sulfonic acids can also be copolymers of vinylcarboxylic and vinylsulfonic acids with other polymerizable monomers, such as acrylic acid esters and styrene.

An anion of a polymeric carboxylic or sulfonic acid is preferred as the polymeric anion in the particles B) mentioned.

The anion of polystyrenesulfonic acid (PSS) is particularly preferred as the polymeric anion.

The molecular weight of the polyacids which supply the polyanions is preferably 1,000 to 2,000,000, particularly preferably 2,000 to 500,000. The polyacids or their alkali metal salts are commercially obtainable, e.g. polystyrenesulfonic acids and polyacrylic acids, or can be prepared by known processes (see e.g. Houben Weyl, Methoden der organischen Chemie, vol. E 20 Makromolekulare Stoffe, part 2, (1987), p. 1141 et seq.).

The dispersion A) can comprise the polymeric anion(s) and electrically conductive polymers in particular in a weight ratio of from 0.5:1 to 50:1, preferably from 1:1 to 30:1, particularly preferably 2:1 to 20:1. The weight of the electrically conductive polymers corresponds here to the weight of the monomers employed, assuming that complete conversion takes place during the polymerization.

Anions which serve as monomeric anions are, for example, those of $C_1$-$C_{20}$-alkanesulfonic acids, such as methane-, ethane-, propane-, butane- or higher sulfonic acids, such as dodecanesulfonic acid, of aliphatic perfluorosulfonic acids, such as trifluoromethanesulfonic acid, perfluorobutanesulfonic acid or perfluorooctanesulfonic acid, of aliphatic $C_1$-$C_{20}$-carboxylic acids, such as 2-ethylhexylcarboxylic acid, of aliphatic perfluorocarboxylic acids, such as trifluoroacetic acid or perfluorooctanoic acid, and of aromatic sulfonic acids optionally substituted by $C_1$-$C_{20}$-alkyl groups, such as benzenesulfonic acid, o-toluenesulfonic acid, p-toluenesulfonic acid or dodecylbenzenesulfonic acid, and of cycloalkanesulfonic acids, such as camphorsulfonic acid, or tetrafluoroborates, hexafluorophosphates, perchlorates, hexafluoroantimonates, hexafluoroarsenates or hexachloroantimonates.

The anions of p-toluenesulfonic acid, methanesulfonic acid or camphorsulfonic acid are preferred as monomeric anions.

Cationic polythiophenes which contain anions as counterions for charge compensation are often also called polythiophene/(poly)anion complexes by persons skilled in the art.

The dispersions A) can comprise one or more dispersing agents D). The following solvents may be mentioned as dispersing agents D) by way of example: aliphatic alcohols, such as methanol, ethanol, i-propanol and butanol; aliphatic ketones, such as acetone and methyl ethyl ketone; aliphatic carboxylic acid esters, such as ethyl acetate and butyl acetate; aromatic hydrocarbons, such as toluene and xylene; aliphatic hydrocarbons, such as hexane, heptane and cyclohexane; chlorohydrocarbons, such as methylene chloride and dichloroethane; aliphatic nitriles, such as acetonitrile; aliphatic sulfoxides and sulfones, such as dimethylsulfoxide and sulfolane; aliphatic carboxylic acid amides, such as methylacetamide, dimethylacetamide and dimethylformamide; and aliphatic and araliphatic ethers, such as diethyl ether and anisole. Water or a mixture of water with the abovementioned organic solvents can furthermore also be used as the dispersing agent D).

Preferred dispersing agents D) are water or other protic solvents, such as alcohols, e.g. methanol, ethanol, i-propanol and butanol, and mixtures of water with these alcohols, water being the particularly preferred solvent.

The dispersion A) can moreover comprise further components, such as surface-active substances, e.g. ionic and nonionic surfactants or adhesion promoters, such as e.g. organofunctional silanes or hydrolysates thereof, e.g. 3-glycidoxypropyltrialkoxysilane, 3-aminopropyltriethoxysilane, 3-mercaptopropyl-trimethoxysilane, 3-methacryloxypropyl-trimethoxysilane, vinyltrimethoxysilane or octyltriethoxysilane, crosslinking agents, such as melamine compounds, masked isocyanates, functional silanes—e.g. tetraethoxysilane, alkoxysilane hydrolysates, e.g. based on tetraethoxysilane, or epoxysilanes, such as 3-glycidoxypropyltrialkoxysilane-polyurethanes, polyacrylates or polyolefin dispersions.

The dispersions A) preferably comprise further additives which increase the conductivity, such as e.g. compounds containing ether groups, such as e.g. tetrahydrofuran, compounds containing lactone groups, such as γ-butyrolactone and γ-valerolactone, compounds containing amide or lactam groups, such as caprolactam, N-methylcaprolactam, N,N-dimethylacetamide, N-methylacetamide, N,N-dimethylformamide (DMF), N-methylformamide, N-methylformanilide, N-methylpyrrolidone (NMP), N-octylpyrrolidone and pyrrolidone, sulfones and sulfoxides, such as e.g. sulfolane (tetramethylene sulfone) and dimethylsulfoxide (DMSO), sugars or sugar derivatives, such as e.g. sucrose, glucose, fructose and lactose, sugar alcohols, such as e.g. sorbitol and mannitol, furan derivatives, such as e.g. 2-furancarboxylic acid and 3-furancarboxylic acid, and/or di- or polyalcohols, such as e.g. ethylene glycol, glycerol and di- and triethylene glycol. Tetrahydrofuran, N-methylformamide, N-methylpyrrolidone, ethylene glycol, dimethylsulfoxide or sorbitol are particularly preferably employed as conductivity-increasing additives.

The dispersions A) can moreover comprise one or more organic binders which are soluble in organic solvents, such as polyvinyl acetate, polycarbonate, polyvinylbutyral, polyacrylic acid esters, polymethacrylic acid esters, polystyrene, polyacrylonitrile, polyvinyl chloride, polybutadiene, polyisoprene, polyethers, polyesters, silicones or styrene/acrylic acid ester, vinyl acetate/acrylic acid ester and ethylene/vinyl acetate copolymers, or water-soluble binders, such as polyvinyl alcohols.

The dispersions A) can have a pH of from 1 to 14, and a pH of from 1 to 8 is preferred. For corrosion-sensitive dielectrics, such as, for example, aluminium oxides or niobium oxides, dispersions having a pH of from 4 to 8 are preferred, in order not to damage the dielectric.

Bases or acids, for example, can be added to the dispersions to adjust the pH. Those additives which do not impair the film formation of the dispersions and are not volatile at higher temperatures, e.g. soldering temperatures, but remain in the solid electrolyte under these conditions are preferred, such as e.g. the bases 2-dimethylaminoethanol, 2,2'-iminodiethanol or 2,2',2''-nitrilotriethanol and the acid polystyrenesulfonic acid.

The viscosity of the dispersion A) can be between 0.1 and 500 mPa·s (measured at 20° C. and a shear rate of 100 s$^{-1}$), depending on the application method. Preferably, the viscosity is 1 to 200 mPa·s, particularly preferably between 1 to 100 mPa·s, very particularly preferably 3 to 50 mPa·s.

FIG. 1 describes a diagrammatic representation of the construction of a solid electrolyte capacitor by the example of a tantalum capacitor comprising
1 capacitor body
5 conductive outer layer optionally present
6 graphite/silver layer
7 wire contact to the electrode body 2
8 outer contacts
9 encapsulation
10 diagram detail FIG. 2 describes the enlarged diagram detail 10 from FIG. 1 which represents the diagrammatic layer construction of the tantalum capacitor comprising
10 diagram detail
2 porous electrode body (anode)
3 dielectric
4 solid electrolyte (cathode)
5 conductive outer layer optionally present
6 graphite/silver layer In principle, such an electrolyte capacitor according to the invention can be produced as follows: firstly e.g. a valve metal powder having a high surface area is pressed and sintered to give a porous electrode body. In this procedure, an electrical contact wire, preferably of a valve metal, such as e.g. tantalum, is conventionally also pressed into the electrode body. Alternatively, metal films can also be etched in order to obtain a porous film.

The electrode body is then covered with a dielectric, i.e. an oxide layer, by anodic oxidation. Thereafter, according to the invention, a dispersion A) comprising at least particles B) of an electrically conductive polymer and a dispersing agent D) is applied to the oxidized electrode body and the dispersing agent D) is at least partly removed and/or cured for formation of the solid electrolyte. Further layers (called conductive outer layer (5) in FIG. 1 and FIG. 2) are optionally applied to the outer layer of the capacitor body. A covering with layers of good conductivity, such as graphite and silver, or a metallic cathode body serves as the electrode for conducting away the current. Finally, the capacitor is contacted and encapsulated.

A process for the production of electrolyte capacitors, characterized in that the electrode material is a valve metal or a compound having electrical properties comparable to a valve metal, is furthermore preferred.

In the context of the invention, valve metal is to be understood as meaning those metals of which the oxide layers do not render current flow equally possible in both directions: If a voltage is applied to the anode, the oxide layers of the valve metals block the current flow, while if a voltage is applied to the cathode, high currents occur, which can destroy the oxide layer. The valve metals include Be, Mg, Al, Ge, Si, Sn, Sb, Bi, Ti, Zr, Hf, V, Nb, Ta and W as well as an alloy or compound of at least one of these metals with other elements. The best-known representatives of the valve metals are Al, Ta and Nb. Compounds having electrical properties comparable to a valve metal are those with metallic conductivity which can be oxidized and the oxide layers of which have the properties described above. For example, NbO has metallic conductivity, but in general is not regarded as a valve metal. However, layers of oxidized NbO have the typical properties of valve metal oxide layers, so that NbO or an alloy or compound of NbO with other elements are typical examples of such compounds having electrical properties comparable to a valve metal.

Electrode materials of tantalum, aluminium and those electrode materials based on niobium or niobium oxide are preferred.

Electrode materials based on niobium or niobium oxide are understood as meaning those materials in which niobium or niobium oxide represents the component with the highest substance content.

The electrode material based on niobium or niobium oxide is preferably niobium, NbO, a niobium oxide $NbO_x$, wherein x can assume values of from 0.8 to 1.2, niobium nitride, niobium oxynitride or mixtures of these materials, or an alloy or compound of at least one of these materials with other elements.

Preferred alloys are alloys with at least one valve metal, such as, for example, Be, Mg, Al, Ge, Si, Sn, Sb, Bi, Ti, Zr, Hf, V, Nb, Ta or W.

Accordingly, the term "oxidizable metal" means not only metals but also an alloy or compound of a metal with other elements, as long as they have metallic conductivity and are oxidizable.

The oxidizable metals are sintered, for example, in powder form to give a porous electrode body, or a porous structure is impressed on a metallic body. The latter can be carried out e.g. by etching of a film.

The porous electrode bodies are subjected to anodic oxidation in a suitable electrolyte. Suitable electrolytes are, for example, dilute acids, such as, for example, phosphoric acid, sulfuric acid, nitric acid, boric acid, acetic acid or adipic acid, or solutions of the salts of acids, such as, for example, sodium phosphates, sodium acetate, ammonium adipate or sodium tetraborate decahydrate. The electrolytes can contain additives or relatively large amounts e.g. of alcohols, such as, for example, methanol, ethanol, butanol or glycols, or of ketones in order to improve the quality of the oxide film.

For the anodic oxidation, the porous electrode bodies, for example impregnated in the electrolyte, are oxidized by application of a voltage. The level of this voltage—also called the anodizing voltage—depends on the oxide layer thickness to be achieved or the later nominal voltage of the capacitor.

An anodizing voltage higher than the nominal voltage is typically chosen, in order to ensure lower residual currents and a higher reliability of the capacitor. Anodizing voltages which are higher than the nominal voltage but lower than 5 times the nominal voltage are preferred, anodizing voltages which are higher than the nominal voltage but lower than 4 times the nominal voltage are particularly preferred, anodizing voltages which are higher than the nominal voltage but lower than 3 times the nominal voltage are very particularly preferred, and anodizing voltages which are higher than the nominal voltage but lower than twice the nominal voltage are extremely preferred. Preferred anodizing voltages are 30 to 1,000 V, particularly preferably 45 to 500 V, very particularly preferably 70 to 500 V, extremely preferably 100 to 500 V.

During the anodic oxidation, the anodizing voltage can be, for example, constant or pulsed or can increase continuously. In this context, the maximum anodizing voltage which occurs determines the oxide film thickness.

The oxide film thickness results from the layer formation factor k, which is characteristic for the oxide, and the maximum anodizing voltage from $$\text{oxide film thickness} = k * \text{maximum anodizing voltage},$$

where the maximum anodizing voltage is stated in volt and the layer formation factor k of the oxide film is stated in nm/volt.

For example, k is approx. 1.2 nm/V for aluminium oxide, approx. 1.8 nm/V for tantalum oxide and approx. 2.8 nm/V for niobium oxide.

Preferably, for example, oxide film thicknesses for capacitors in which the electrode material is based on aluminium are greater than 30 nm, particularly preferably greater than 50 nm, very particularly preferably greater than 80 nm, extremely preferably greater than 110 nm.

Preferably, for example, oxide film thicknesses for capacitors in which the electrode material is based on tantalum are greater than 50 nm, particularly preferably greater than 80 nm, very particularly preferably greater than 120 nm, extremely preferably greater than 170 nm.

Preferably, for example, oxide film thicknesses for capacitors in which the electrode material is based on niobium or niobium oxide are greater than 80 nm, particularly preferably greater than 130 nm, very particularly preferably greater than 190 nm, extremely preferably greater than 260 nm.

Preferably, metal powders having a specific charge of from 500 to 200,000 µC/g, particularly preferably having a specific charge of from 1,000 to 100,000 µC/g, very particularly preferably having a specific charge of from 1,000 to 50,000 µC/g are employed for the preparation of the electrode body.

In this context, the specific charge is calculated as follows:

Specific charge=(capacitance*anodizing voltage)/ weight of the oxidized electrode body.

In this context, the capacitance is obtained from the capacitance of the oxidized electrode body, measured at 120 Hz, in an aqueous electrolyte. The electrical conductivity of the electrolyte here is sufficiently high for a drop in capacitance due to the electrical resistance of the electrolyte not yet to occur at 120 Hz. For example, 18% strength aqueous sulfuric acid electrolyte is employed for the measurement.

The electrode bodies employed have a porosity of from 10 to 90%, preferably from 30 to 80%, particularly preferably from 50 to 80%.

The porous electrode bodies have an average pore diameter of from 10 to 10,000 nm, preferably from 50 to 5,000 nm, particularly preferably from 100 to 3,000 nm.

The present invention accordingly particularly preferably provides a process for the production of electrolyte capacitors, characterized in that the valve metal or the compound having electrical properties comparable to a valve metal is tantalum, niobium, aluminium, titanium, zirconium, hafnium, vanadium, an alloy or compound of at least one of these metals with other elements, NbO or an alloy or compound of NbO with other elements.

The dielectric preferably comprises an oxide of the electrode material. It optionally comprises further elements and/or compounds.

The capacitance of the oxidized electrode body depends on the surface area and the thickness of the dielectric, as well as on the nature of the dielectric. The specific charge is a measure of how much charge per unit weight the oxidized electrode body can accommodate. The specific charge is calculated as follows:

Specific charge=(capacitance*nominal voltage)/ weight of the oxidized electrode body.

The capacitance is obtained from the capacitance of the finished capacitor measured at 120 Hz and the nominal voltage is the specified operating voltage of the capacitor (rated voltage). The weight of the oxidized electrode body relates to the pure weight of the porous electrode material covered with dielectric, without polymer, contacts and encapsulations.

Preferably, the electrolyte capacitors produced by the process according to the invention have a specific charge of from 100 to 100,000 µC/g, particularly preferably a specific charge of from 500 to 75,000 µC/g, very particularly preferably a specific charge of from 500 to 30,000 µC/g.

Preferred electrolyte capacitors have nominal voltages of greater than 15 V, particularly preferably nominal voltages of greater than 19 V, very particularly preferably nominal voltages of greater than 24 V and extremely preferably nominal voltages of greater than 34 V.

Precursors for the preparation of conductive polymers of the particles B) in the dispersion, also called precursors in the following, are understood as meaning corresponding monomers or derivatives thereof. Mixture of various precursors can also be used. Suitable monomeric precursors are, for example, optionally substituted thiophenes, pyrroles or anilines, preferably optionally substituted thiophenes, particularly preferably optionally substituted 3,4-alkylenedioxythiophenes.

Substituted 3,4-alkylenedioxythiophenes which may be mentioned by way of example are the compounds of the general formula (III) or (IV) or a mixture of thiophenes of the general formulae (III) and (IV)

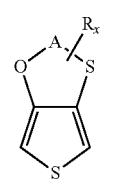

(III)

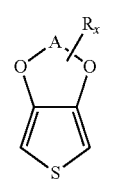

(IV)

wherein

A represents an optionally substituted $C_1$-$C_5$-alkylene radical, preferably an optionally substituted $C_2$-$C_3$-alkylene radical, R represents a linear or branched, optionally substituted $C_1$-$C_{18}$-alkyl radical, preferably linear or branched, optionally substituted $C_1$-$C_4$-alkyl radical, an optionally substituted $C_5$-$C_{12}$-cycloalkyl radical, an optionally substituted $C_6$-$C_{14}$-aryl radical, an optionally substituted $C_7$-$C_{18}$-aralkyl radical, an optionally substituted $C_1$-$C_4$-hydroxyalkyl radical, preferably optionally substituted $C_1$-$C_2$-hydroxyalkyl radical, or a hydroxyl radical, x represents an integer from 0 to 8, preferably from 0 to 6, particularly preferably 0 or 1 and in the case where several radicals R are bonded to A, these can be identical or different.

Optionally substituted 3,4-ethylenedioxythiophenes are very particularly preferred monomeric precursors.

Substituted 3,4-ethylenedioxythiophenes which may be mentioned by way of example are the compounds of the general formula (V)

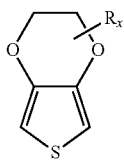

(V)

wherein

R and x have the meaning given for the general formulae (III) and (IV).

In the context of the invention, derivatives of these monomeric precursors are understood as meaning, for example, dimers or trimers of these monomeric precursors. Higher molecular weight derivatives, i.e. tetramers, pentamers etc., of the monomeric precursors are also possible derivatives.

Derivatives of substituted 3,4-alkylenedioxythiophenes which may be mentioned by way of example are the compounds of the general formula (VI)

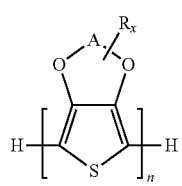

(VI)

wherein n represents an integer from 2 to 20, preferably 2 to 6, particularly preferably 2 or 3, and A, R and x have the meaning given for the general formulae (III) and (IV).

The derivatives can be built up from either identical or different monomer units and can be employed in the pure form and in a mixture with one another and/or with the monomeric precursors. Oxidized or reduced forms of these precursors are also included by the term "precursors" in the context of the invention, as long as the same conductive polymers are formed during their polymerization as in the case of the precursors listed above.

Possible substituents for the abovementioned precursors, in particular for the thiophenes, preferably for the 3,4-alkylenedioxythiophenes, are the radicals mentioned for R for the general formulae (III) and (IV).

Possible substituents for pyrroles and anilines are, for example, the abovementioned radicals A and R and/or the further substituents of the radicals A and R.

Possible optional further substituents of the radicals A and/or of the radicals R are the organic groups mentioned in connection with the general formulae (I) and (II).

Processes for the preparation of the monomeric precursors for the preparation of conductive polymers and derivatives thereof are known to the person skilled in the art and are described, for example, in L. Groenendaal, F. Jonas, D. Freitag, H. Pielartzik & J. R. Reynolds, Adv. Mater. 12 (2000) 481-494 and literature cited therein.

The 3,4-alkylenoxythiathiophenes of the formula (III) required for the preparation of the polythiophenes to be used are known to the person skilled in the art or can be prepared by known processes (for example in accordance with P. Blanchard, A. Cappon, E. Levillain, Y. Nicolas, P. Frere and J. Roncali, Org. Lett. 4 (4), 2002, p. 607-609).

The preparation of the dispersions from the precursors described above is carried out, for example, under conditions analogous to those mentioned in EP-A 440 957 (U.S. Pat. No. 5,300,575). An improved variant for the preparation of the dispersions is the use of an ion exchanger for removal of the inorganic salt content or a part thereof. Such a variant is described, for example, in DE-A 19 627 071 (U.S. Pat. No. 6,376,105). The ion exchanger can be stirred with the product, for example, or the product is conveyed over a column packed with an ion exchanger column. By using the ion exchanger, for example, the low metal contents described above can be achieved.

The particle size of the particles B) in the dispersion A) can be reduced, for example, by means of a high pressure homogenizer after the desalination. This operation can also be repeated in order to increase the effect. Particularly high pressures of between 100 and 2,000 bar have proved advantageous for greatly reducing the particle size.

A preparation of the polyaniline/polyanion or polythiophene/polyanion complex and subsequent dispersion or redispersion in one or more solvent(s) is also possible.

The solids content of the particles B) of the electrically conductive polymer in the dispersion A) is 0.1-90 wt. %, preferably 0.5-30 wt. % and very particularly preferably 0.5-10 wt. %.

The particles B) of the conductive polymer preferably form a stable dispersion. However, unstable dispersions can also be used, in that these are stirred, rolled or shaken up, for example, before use in order to ensure a uniform distribution of the particles B).

The dispersions A) are applied to the dielectric of the electrode body by known processes, e.g. by spincoating, impregnation, pouring, dripping on, spraying, atomizing on, knife-coating on, brushing or printing, for example ink-jet, screen, contact or tampon printing.

The penetration of the dispersion into the porous electrode body can be facilitated, for example, by increased or reduced pressure, vibration, ultrasound or heat.

The application can be carried out on to the dielectric of the electrode body directly or using an adhesion promoter, for example a silane, such as e.g. organofunctional silanes or hydrolysates thereof, e.g. 3-glycidoxypropyltrialkoxysilane, 3-aminopropyltriethoxysilane, 3-mercaptopropyltrimethoxysilane, 3-methacryloxypropyltrimethoxysilane, vinyltrimethoxysilane or octyltriethoxysilane, and/or one or more other functional layers.

After application of the dispersion A), the dispersing agent D) is preferably removed, so that the solid electrolyte can form from the particles B) and optionally further additives in the dispersion. However, it is also possible for at least a part of the dispersing agent D) to remain in the solid electrolyte. Depending on the nature of the dispersing agent D), this can also be cured either in its entirety, or only the part still remaining after the partial removal.

The removal of the dispersing agent D) after application of the dispersion can be carried out by simple evaporation at room temperature. However, to achieve higher processing speeds it is more advantageous to remove the dispersing agents D) at elevated temperatures, e.g. at temperatures of from 20 up to 300° C., preferably 40 up to 250° C. A thermal after-treatment can be combined directly with the removal of the solvent, or can be carried out at a time removed from the production of the coating.

The duration of the heat treatment is 5 seconds to several hours, depending on the nature of the dispersion used for the coating. Temperature profiles with different temperatures and dwell times can also be employed for the heat treatment.

The heat treatment can be carried out e.g. by a procedure in which the coated oxidized electrode bodies are moved though a heating chamber, which is at the desired temperature, at a speed such that the desired dwell time at the chosen temperature is achieved, or are brought into contact for the desired dwell time with a hot-plate which is at the desired temperature. Furthermore, the heat treatment can be carried out, for example, in a heating oven or several heating ovens each with different temperatures.

Depending on the nature of the oxidized electrode body, it may be advantageous to impregnate the oxidized electrode body with the dispersions further times, in order to achieve thicker polymer layers and/or a higher covering of the dielectric surface.

Preferably, the application of the dispersion A) and the at least partial removal and/or curing of the dispersing agent D) are carried out several times.

Further steps can optionally be carried out between a) the application of the dispersion and b) the at least partial removal and/or curing of the dispersing agent D).

As optional further steps, for example, some of the dispersion can be removed from the oxidized electrode body again, a further impregnation can be carried out with the same or a different dispersion, rinsing with the same or different solvents optionally containing additives can be carried out, or storage can take place.

It has been found, surprisingly, that removal of the dispersion from the outer surface of the oxidized electrode body after the application and before the drying, especially in the case of several impregnating and drying cycles, leads to a higher covering and a lower ESR.

A process is accordingly preferred in which after application of the dispersion A), at least some of the particles B) of the conductive polymer which are on the outer surface of the electrode body, particularly preferably as many as possible, are removed. This can be carried out e.g. by rinsing off, dabbing off, blowing off, spinning off or the like. The use of, for example, ultrasound, heat or radiation to remove the outer polymer film is also possible. Rinsing with a solvent, preferably with the solvent which is used as the dispersing agent, is preferred.

However, the particles B) of the conductive polymer can also be removed from the outer surface of the electrode body, for example by ultrasound, a laser beam, solvents or mechanical detachment, after the at least partial removal and/or curing of the dispersing agent D).

The covering of the dielectric with the solid electrolyte can be determined as follows: The capacitance of the capacitor is measured at 120 Hz in the dry and wet state. The degree of covering is the ratio of the capacitance in the dry state to the capacitance in the wet state, expressed in percent. Dry state means that the capacitor has been dried at elevated temperature (80-120° C.) for several hours before it is measured. Wet state means that the capacitor is exposed to a saturated atmospheric humidity under elevated pressure, for example in a steam pressure boiler, for several hours. During this procedure the moisture penetrates into pores which are not covered by the solid electrolyte and acts as a liquid electrolyte there.

The covering of the dielectric by the solid electrolyte is preferably greater than 50%, particularly preferably greater than 70%, very particularly preferably greater than 80%.

After production of the solid electrolyte, further conductive layers can be applied to the capacitor body, such as e.g. a conductive outer layer. Preferably, a polymeric outer layer, for example as described in European Patent Application EP-A 1 524 678 (U.S. Pat. No. 6,987,663), is applied. Further layers of good conductivity, such as, for example, graphite and/or silver layers, serve as a current collector. Finally, the capacitor is contacted and encapsulated.

It has been found, surprisingly, that the capacitors produced by the process according to the invention have a significantly higher break-through voltage than capacitors which have been produced by an in situ polymerization process.

The break-through voltage of the capacitors according to the invention is preferably greater than 150% of the nominal voltage of the capacitors, particularly preferably greater than 200% of the nominal voltage, very particularly preferably greater than 250% of the nominal voltage.

The break-through voltage of the capacitors according to the invention is preferably greater than 40% of the anodizing voltage of the electrode bodies, particularly preferably greater than 50% of the anodizing voltage, very particularly preferably greater than 60% of the anodizing voltage, extremely preferably greater than 75% of the anodizing voltage.

The ratio $\tau$ of the break-through voltage (in volt) to the quotient of the oxide film thickness d (in nm) and the layer formation factor k (in nm/volt) of the oxide $$\tau = \text{break-through voltage}/(d/k)$$

accordingly indicates the ratio of the break-through voltage to the anodizing voltage and is a measure of the reliability of the capacitor.

Preferably, an electrolyte capacitor having a solid electrolyte comprising conductive polymers and a nominal voltage of greater than 15 V is characterized in that the value $\tau$ is greater than 0.4, particularly preferably greater than 0.5, very particularly preferably greater than 0.6 and extremely preferably greater than 0.75.

The process according to the invention thus renders possible the production of solid electrolyte capacitors having a high nominal voltage, the production of which was not hitherto possible by means of in situ polymerization of the solid electrolyte. The capacitors produced by the process according to the invention are distinguished by a low equivalent series resistance (ESR), a low residual current and a high break-through voltage.

On the basis of their low residual current and their low ESR, the electrolyte capacitors produced according to the invention are outstandingly suitable for use as a component in electronic circuits which require a high nominal voltage, such as, for example, in automobile electronics, in voltage supplies or control systems for electric motors. The present invention also provides the use. Electronic circuits such as are found, for example, in computers (desktop, laptop, server), in computer peripheral equipment (e.g. PC cards), in portable electronic equipment, such as e.g. mobile telephones, digital cameras or electronic entertainment systems, in equipment for electronic entertainment systems, such as e.g. in CD/DVD payers and computer game consoles, in navigation systems, in telecommunications equipment, in domestic appliances, in voltage supplies, in motor control systems or in automobile electronics are preferred.

The following examples serve to explain the invention by way of example and are not to be interpreted as a limitation.

EXAMPLES

Example 1

868 g deionized water and 330 g of an aqueous polystyrenesulfonic acid solution having an average molecular weight of 70,000 and a solids content of 3.8 wt. % were initially introduced into a 2 l three-necked flask with a stirrer and internal thermometer. The reaction temperature was kept between 20 and 25° C. 5.1 g 3,4-ethylenedioxythiophene were added, while stirring. The solution was stirred for 30 minutes. 0.03 g iron(III) sulfate and 9.5 g sodium persulfate were then added and the solution was stirred for a further 24 h.

After the reaction had ended, to remove inorganic salts 100 ml of a strongly acid cation exchanger and 250 ml of a weakly basic anion exchanger were added and the solution was stirred for a further 2 h. The ion exchanger was filtered off. The poly(3,4-ethylenedioxythiophene)/polystyrenesulfonate dispersion was homogenized ten times with a high pressure homogenizer under a pressure of 700 bar. The dispersion was then concentrated to a solids content of 1.6%.

The dispersion A)-1 prepared in this way had the following particle size distribution:

| | |
|---|---|
| $d_{10}$ | 19 nm |
| $d_{50}$ | 26 nm |
| $d_{90}$ | 40 nm |

The diameter of the particles B) of the conductive polymer is based on a weight distribution of the particles B) in the dispersion as a function of the particle diameter. The determination was carried out via an ultracentrifuge measurement. The particle size was determined in the swollen state of the particles.

The viscosity of the dispersion was 26 mPa*s at a shear rate of 100 Hz and 20° C. An ICP analysis of the metal contents of dispersion A)-1 gave the following values:
Sodium (Na): 110 mg/kg
Magnesium (Mg): 0.58 mg/kg
Aluminium (Al): 1.0 mg/kg
Silicon (Si): 1.2 mg/kg
Phosphorus (P): 5.9 mg/kg
Potassium (K): 0.53 mg/kg
Calcium (Ca): 3.9 mg/kg
Chromium (Cr): 0.16 mg/kg
Iron (Fe): 0.89 mg/kg
Zinc (Zn): <0.01 mg/kg Example 2

5 g dimethylsulfoxide (DMSO) were added to 100 g of dispersion A)-1 from Example 1 and the mixture was stirred to form a dispersion A)-2. One part of this dispersion A)-2 was spin-coated on to a glass microscope slide (26 mm*26 mm*1 mm) by means of a spincoater (Chemat Technology KW-4A) at 1,000 rpm for 5 seconds. The sample was dried at 120° C. for 10 min. Two opposite edges of the microscope slide were then coated with conductive silver. After drying of the conductive silver, the two silver strips were contacted and the surface resistance was determined with a Keithley 199 Multimeter. The layer thickness was determined with a Tencor Alpha Step 500 Surface Profiler. The specific conductivity a was determined from the surface resistance and layer thickness d from $\sigma=1/(R_s*d)$. The layer thickness was 120 nm and the specific conductivity was 483 S/cm.

Example 3

3.1 Production of Oxidized Electrode Bodies

Tantalum powder having a specific capacitance of 30,000 µFV/g was pressed, with inclusion of a tantalum wire 7, to pellets and sintered in order to form a [missing noun] having the dimensions of 4.25 mm*3 mm*1 mm. The porous electrode bodies 2 had an average pore diameter of 960 nm and were anodized in a phosphoric acid electrolyte at 150 V for formation of a dielectric, which corresponds to an oxide film thickness of approx. 270 nm.

3.2 Production of the Solid Electrolyte by the Process According to the Invention 100 g of dispersion A)-1 from Example 1, 4 g dimethylsulfoxide (DMSO) and 0.5 g 3-glycidoxypropyltrimethoxysilane (Silquest A-187, OSi Specialties) were mixed intensively in a glass beaker with a stirrer to form a dispersion A)-3.

The oxidized electrode bodies were impregnated in this dispersion A)-3 for 1 min. The impregnated electrode bodies were then rinsed under running water in order to remove the dispersion A)-3 on the outsides of the electrode body. Thereafter, drying was carried out at 120° C. for 10 min. Impregnation, rinsing and drying were carried out nine further times.

3.3 Production of a Polymeric Outer Layer a.) Preparation of a Dispersion A)-4:

868 g deionized water and 330 g of an aqueous polystyrenesulfonic acid solution having an average molecular weight of 70,000 and a solids content of 3.8 wt. % were initially introduced into a 2 l three-necked flask with a stirrer and internal thermometer. The reaction temperature was kept between 20 and 25° C. 5.1 g 3,4-ethylenedioxythiophene were added, while stirring. The solution was stirred for 30 minutes. 0.03 g iron(III) sulfate and 9.5 g sodium persulfate were then added and the solution was stirred for a further 24 h. After the reaction had ended, to remove inorganic salts 100 ml of a strongly acid cation exchanger and 250 ml of a weakly basic anion exchanger were added and the solution was stirred for a further 2 h. The ion exchanger was filtered off.

Preparation of a PEDT/Toluenesulfonate Powder:

2.5 l demineralized water were initially introduced into a 5 l glass reactor with a stirrer and thermometer. 214.2 g p-toluenesulfonic acid monohydrate and 2.25 g iron(III) sulfate heptahydrate were introduced, while stirring. When everything had dissolved, 85.8 g 3,4-ethylenedioxythiophene were added and the mixture was stirred for 30 minutes. 192.9 g sodium peroxodisulfate were then introduced, while stirring, and the mixture was stirred at room temperature for a further 24 hours. After the end of the reaction, the PEDT/toluenesulfonate powder formed was filtered off on a porcelain suction filter, washed with 3 l demineralized water and finally dried at 100° C. for 6 hours. 89 g of a blue-black PEDT-toluenesulfonate powder were obtained.

180 g of the PEDT/PSS dispersion A)-4, 10 g of a sulfopolyester (Eastek 1100, Eastman), 8 g dimethylsulfoxide, 1 g 3-glycidoxypropyltrimethoxysilane (Silquest A-187, OSi Specialties) and 0.4 g of wetting agent (Dynol 604, Air Products) were mixed intensively in a glass beaker with a stirrer for one hour. 2 g of the PEDT/toluenesulfonate powder were then dispersed in by means of a bead mill dissolver unit. For this, 300 g zirconium oxide beads (Ø 1 mm) were added and the mixture was stirred at 7,000 rpm for 1 hour, while cooling with water. Finally, the grinding beads were separated off over a 0.8 µm sieve. This dispersion A)-5 obtained had a solids content of 4.7%.

The capacitor bodies from 3.2 were impregnated in this dispersion A)-5 and then dried at 120° C. for 10 min. Impregnation and drying were carried out a second time. Finally, the electrode bodies were coated with a graphite and silver layer.

The average electrical values of 9 of the capacitors produced were determined:
Capacitance: 9.3 µF
ESR: 53 mΩ
Residual current at a nominal voltage of 40 V: <0.1 µA The capacitance was determined at 120 Hz and the equivalent series resistance (ESR) at 100 kHz by means of an LCR meter (Agilent 4284A). The residual current was determined with a Keithley 199 Multimeter three minutes after application of a 40 V voltage. The residual currents were below the measurement limit of the Multimeter of 0.1 µA.

The break-through voltage was then determined on 18 of the capacitors produced. For this, each capacitor was provided with a series resistor of 1,000Ω and subjected to an increasing voltage starting from 0 V, with voltage steps of 1 V/s. The current which thereby occurred was measured with a Keithley 199 Multimeter. The voltage value at which the current occurring rose to more than 500 µA was specified as the break-through voltage.

The 18 capacitors had on average a break-through voltage of 119 V.

Comparison Example 1

18 anodized electrode bodies were produced analogously to Example 3.1. These electrode bodies were provided with a solid electrolyte by means of a chemical in situ polymerization.

For this, a solution consisting of one part by weight of 3,4-ethylenedioxythiophene (BAYTRON® M, H.C. Starck GmbH) and 20 parts by weight of a 40 wt. % strength ethanolic solution of iron(III) p-toluenesulfonate (BAYTRON® C-E, H.C. Starck GmbH) was prepared.

The solution was used for impregnating the 18 anodized electrode bodies (2). The electrode bodies (2) were impregnated in this solution and then dried at room temperature (20° C.) for 30 min. Thereafter, they were heat-treated at 50° C. in a drying cabinet for 30 min. The electrode bodies were then washed in a 2 wt. % strength aqueous solution of p-toluenesulfonic acid for 60 min.

The electrode bodies were then re-formed in a 0.25 wt. % strength aqueous solution of p-toluenesulfonic acid. However, it was not possible, as was desired, to set the re-forming voltage at the level of the anodizing voltage of 150 V. In order to achieve re-forming voltages of 75 to 100 V, which were already significantly lower, the re-forming current per electrode body had to be increased so greatly that the electrode bodies were damaged, since the current no longer dropped in the course of time. Furthermore, as the re-forming voltage increased, a marked evolution of gas occurred on the electrode bodies.

The production of a solid electrolyte by means of in situ polymerization was not possible for electrode bodies with an anodizing voltage of 150 V and a nominal voltage of 40 V.

Example 4

4.1 Production of Oxidized Electrode Bodies

Tantalum powder having a specific capacitance of 30,000 µFV/g was pressed, with inclusion of a tantalum wire 7, to pellets and sintered in order to form a [missing noun] having the dimensions of 4.25 mm*3 mm*1 mm. The porous electrode bodies (2) had an average pore diameter of 960 nm and were anodized in a phosphoric acid electrolyte at 100 V for formation of a dielectric, which corresponds to an oxide film thickness of approx. 180 nm.

4.2 Production of the Solid Electrolyte by the Process According to the Invention The production of the solid electrolyte was carried out analogously to Example 3.2.

4.3 Production of a Polymeric Outer Layer

The production of the polymeric outer layer was carried out analogously to Example 3.3. Finally, the electrode bodies were coated with a graphite and silver layer.

The electrical values of the capacitors are to be found in Table 1.

Comparison Example 2

9 anodized electrode bodies were produced analogously to Example 4.1. These electrode bodies were provided with a solid electrolyte by means of a chemical in situ polymerization.

For this, a solution consisting of one part by weight of 3,4-ethylenedioxythiophene (BAYTRON® M, H.C. Starck GmbH) and 20 parts by weight of a 40 wt. % strength ethanolic solution of iron(III) p-toluenesulfonate (BAYTRON® C-E, H.C. Starck GmbH) was prepared.

The solution was used for impregnating the 9 anodized electrode bodies (2). The electrode bodies (2) were impregnated in this solution and then dried at room temperature (20° C.) for 30 min. Thereafter, they were heat-treated at 50° C. in a drying cabinet for 30 min. The electrode bodies were then washed in a 2 wt. % strength aqueous solution of p-toluenesulfonic acid for 60 min. The electrode bodies were re-formed in a 0.25 wt. % strength aqueous solution of p-toluenesulfonic acid at 50 V with 9 mA for 30 min and then rinsed in distilled water and dried. The impregnation, drying, heat treatment and re-forming described were carried out a further two more times with the same electrode bodies.

The capacitor bodies were then provided with a polymeric outer layer analogously to Example 4.3. Finally, the electrode bodies were coated with a graphite and silver layer.

The electrical values of the capacitors are to be found in Table 1.

Comparison Example 3

9 capacitors were produced analogously to Comparison Example 2, but a re-forming voltage of 75 V was set. The current which thereby occurred was 72 mA.

The electrical values of the capacitors are to be found in Table 1.

Comparison Example 4

9 capacitors were produced analogously to Comparison Example 2, but no re-forming was carried out.

The electrical values of the capacitors are to be found in Table 1.

TABLE 1

|  | Example 4 | Comparison Example 2 | Comparison Example 3 | Comparison Example 4 |
|---|---|---|---|---|
| Capacitance [μF] | 15 | 15 | 14 | 15 |
| ESR [mΩ] | 39 | 32 | 500 | 38 |
| Break-through voltage [V] | 96 | 62 | 89 | 0 |

The capacitance was determined at 120 Hz and the equivalent series resistance (ESR) at 100 kHz by means of an LCR meter (Agilent 4284A). The break-through voltage was determined analogously to Example 3.

All the capacitors have a similar capacitance. However, the capacitors from Example 4 are distinguished by a low ESR and at the same time a high break-through voltage and therefore a high reliability. They are therefore suitable for high nominal voltages up to approx. 50 V. On the other hand, the capacitors from the comparison examples have only either a low ESR or a high break-through voltage, but not both at the same time.

The capacitors from Comparison Example 4 were short-circuited, since they were not re-formed. The break-through voltage was therefore 0 V. These capacitors cannot be used.

Re-forming at 50 V indeed increases the break-through voltage in Comparison Example 2 to 62 V, but this is far below the anodizing voltage of 100 V, so that the capacitors from Comparison Example 2 would have a low reliability at a high nominal voltage.

In Comparison Example 3, the break-through voltage can be increased significantly by a re-forming at 75 V, but the solid electrolyte is thereby destroyed, so that the ESR increases over one order of magnitude. As a result, these capacitors can no longer be used.

This comparison shows that no polymer solid electrolyte capacitors for high nominal voltages can be produced with a chemical in situ polymerization. This is possible, however, with the process according to the invention.

All the references described above are incorporated by reference in its entirety for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

We claim:

1. An electrolyte capacitor produced with the process comprising process steps:
   Subjecting a porous electrode body of an electrode material to anodic oxidation for formation of a dielectric which covers the surface of the electrode material,
   Applying a dispersion A) on to the porous body wherein the porous body comprises the porous electrode body of the electrode material and the dielectric,
   wherein said dispersion A) comprises at least particles B) of an electrically conductive polymer and a dispersing agent D), and
forming a solid electrolyte which completely or partly covers the dielectric surface, and the dispersing agent D) is at least partly removed and/or cured,
wherein the maximum anodizing voltage during the anodic oxidation of the porous electrode body is greater than 30 V and the particles B) of the conductive polymer in the dispersion A) have an average diameter of from 1 to 100 nm, wherein the particles B) comprise a cationic polythiophene and a polymeric anion as a counter-ion, the cationic polythiophene and the polymeric anion being present on the form of a polythiophene/polymeric anion complex.

2. The electrolyte capacitor according to claim 1, wherein the electrolyte capacitor has a specific charge of from 100 to 100,000 μC/g, based on the weight of the electrode body covered with a dielectric.

3. The electrolyte capacitor according to claim 1, wherein the electrolyte capacitor has a nominal voltage of greater than 15 V.

4. The electrolyte capacitor according to claim 1, wherein electrolyte capacitor has a break-through voltage of greater than 150% of the nominal voltage.

5. The electrolyte capacitor according to claim 1, wherein the electrolyte capacitor has a break-through voltage of greater than 40% of the anodizing voltage.

6. The electrolyte capacitor according to claim 1, wherein the electrode material is based on aluminium and the thickness of the dielectric is greater than 30 nm.

7. The electrolyte capacitor according to claim 1, wherein the electrode material is based on tantalum and the thickness of the dielectric is greater than 50 nm.

8. The electrolyte capacitor according to claim 1, wherein the electrode material is based on niobium or niobium oxide and the thickness of the dielectric is greater than 80 nm.

9. An electronic circuit comprising an electrolyte capacitor as claimed in claim 1.

10. The electrolyte capacitor according to claim 1, wherein forming a solid electrolyte which completely or partly covers the dielectric surface, and the dispersing agent D) is at least partly removed and/or cured, is in the absence of chemical in situ oxidative polymerization.

11. An electrolyte capacitor produced with a process comprising process steps:
   Subjecting a porous electrode body of an electrode material to anodic oxidation for formation of a dielectric which covers the surface of the electrode material,
   applying a dispersion A) on to the porous body wherein the porous body comprises the porous electrode body of the electrode materials and the dielectric,
   wherein said dispersion A) comprises at least particle B) of an electrically conductive polymer and a dispersing agent D), and
   forming a solid electrolyte which completely or partly covers the dielectric surface, and the dispersing agent D) is at least partly removed and/or cured,
wherein the maximum anodizing voltage during the anodic oxidation of the porous electrode body is greater than 30 V and the particles B) of the conductive polymer in the dispersion A) have an average diameter of from 1 to 100 nm, and wherein the particles B) comprise at least one polythiophene carrying positive charges in the polythiophene main chain, wherein the polythiophene has recurring units of the general formula (I) or the formula (II) or recurring units of the general formulae (I and (II)

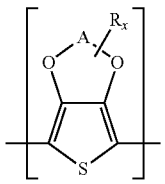

(II)

wherein

A represents an optionally substituted $C_2$-$C_3$-alkylene radical, x represents 1 and indicates that 1 substituent R is bonded to A, and R represents a sulfonate- or carboxylate substituted, negatively charged radical, wherein the positive charges of the polythiophene main chain are partly or completely satisfied by the negative charges present on the radicals R.

12. The electrolyte capacitor according to claim 11, wherein the electrolye capacitor has a specific charge of from 100 to 100,000 μC/g based on the weight of the electrode body covered with a dielectric.

13. The electrolye capacitor according to claim 11, wherein the electrolyte capacitor has a nominal voltage of greater than 15 V.

14. The electrolyte capacitor according to claim 11, wherein electrolyte capacitor has a break-through voltage of greater than 150% of the nominal voltage.

15. The electrolyte capacitor according to claim 11, wherein the electrolyte capacitor has a break-through voltage of greater than 40% of the anodizing voltage.

16. The electrolyte capacitor according to claim 11, wherein the electrode material is based on aluminum and the thickness of the dielectric is grater and 30 nm.

17. The electrolyte capacitor according to claim 11, wherein the electrode material is based on tantalum and the thickness of the dielectric is greater than 50 nm.

18. The electrolyte capacitor according to claim 11, wherein the electrode material is based on niobium or niobium oxide and the thickness of the dielectric is greater than 80 nm.

19. An electronic circuit comprising an electrolyte capacitor as claimed in claim 11.

20. The electrolyte capacitor according to claim 11, wherein forming a solid electrolyte which completely or partly covers the dielectric surface, and the dispersing agent D) is at least partly removed and/or cured, is in the absence of chemical in situ oxidative polymerization.

* * * * *